United States Patent [19]

Adams et al.

[11] Patent Number: 4,859,547
[45] Date of Patent: Aug. 22, 1989

[54] BATTERY TERMINAL AND METHOD

[75] Inventors: David W. Adams, Columbus, Ga.;
Larry K. W. Ching, Jr., Littleton;
Neil Puester, Aurora, both of Colo.

[73] Assignee: Gates Energy Products, Inc.,
Gainesville, Fla.

[21] Appl. No.: 106,700

[22] Filed: Oct. 6, 1987

[51] Int. Cl.⁴ .................... H01M 2/26; H01M 2/08
[52] U.S. Cl. .................... 429/121; 429/180;
429/184; 29/623.2
[58] Field of Search .................. 429/121, 178–183;
29/623.1, 623.2

[56] References Cited

U.S. PATENT DOCUMENTS

| | | | |
|---|---|---|---|
| 1,193,358 | 8/1916 | Carpenter | 429/178 X |
| 1,303,311 | 5/1919 | Hazelett | 429/178 |
| 2,100,921 | 11/1937 | Rolph | 429/181 X |
| 3,554,813 | 1/1971 | Feldwake | 29/623.2 |
| 3,843,411 | 10/1974 | Orlando et al. | 29/623.1 |
| 3,849,203 | 11/1974 | Hollis et al. | 136/135 |
| 4,006,282 | 2/1977 | Antoine | 429/181 |
| 4,075,368 | 2/1978 | Salamon et al. | 429/161 |
| 4,233,373 | 11/1980 | Meyer-Warlow et al. | 429/181 |
| 4,385,100 | 5/1983 | Hooke et al. | 429/183 |
| 4,522,899 | 6/1985 | Illmann et al. | 429/181 |
| 4,522,900 | 6/1985 | Mejia | 429/181 |
| 4,523,068 | 6/1985 | Lund et al. | 219/10.53 |

FOREIGN PATENT DOCUMENTS 0140581 9/1984 European Pat. Off. .

Primary Examiner—Stephen J. Kalafut
Attorney, Agent, or Firm—Jack E. Ebel; Curtis H. Castleman, Jr.; H. W. Oberg, Jr.

[57] ABSTRACT

A battery terminal post of the type for use in electrolytic devices contained by resilient electrolyte-resistant walls, wherein an opening in the electrolytic device wall is radially enlarged to form a bushing, into which is inserted a second T-shaped lead alloy bushing, into which in turn there is inserted a complementary third bushing of pure lead, which three bushings are then forced into intimate sealing contact by being radially expanded by the action of a punch and die in a swaging operation.

31 Claims, 4 Drawing Sheets

BATTERY TERMINAL AND METHOD

BACKGROUND OF THE INVENTION

1. Field of the Invention

The invention relates to a terminal apparatus for an electrolytic device such as a battery, and more particularly relates to a terminal apparatus installed in a battery container wall, compressibly set against the opening in the battery container wall so as to seal against gas and/or electrolyte leakage.

2. General State of the Art

A recurring problem in the battery industry is that of being able to seal a battery terminal where it leaves the battery container. Ideally, a batter terminal should be able to seal against leakage of electrolyte and/or gases contained within the battery, whose escape would be undesirable.

One common approach is to cast an alloy lead bushing with multiple latitude rings and then mold the plastic of a battery case around the lead bushing. The intent of this approach is to try to get the plastic to shrink around the lead to maintain a seal between the lead and the plastic. However, thermal cycling will allow the plastic to creep in relation to the lead, due to the differences in coefficients of thermal expansion of the plastic and the metal. Thus, the seal will frequently fail, allowing capillary seepage at the interface of the plastic and lead.

Another approach to the problem has been to take a premolded alloy lead bushing and subsequently roll form or swage the bushing into a cavity in the plastic. Initially, this results in a tight, intimate sealing surface between the lead and the plastic. However, as time goes on, thermal cycling will again cause the opposing sealing surfaces of the metal and the plastic to creep relative to one another, again eventually allowing capillary seepage to occur at the interface.

Moreover, the designs described above are intended to operate with very little pressure differential across the seal. Battery systems exist which will exert considerably more pressure across the seal. For example, sealed lead-acid, starved electrolyte recombinant systems, such as are manufactured by Gates Energy Products of Denver, Colo., operate over a pressure differential range of anywhere from partial vacuum to over 1.3 atmospheres. In a situation such as this, a much more efficient seal is required between the lead and the plastic at the terminal interface to permit prolonged use of such a battery without failure due to capillary seepage. Battery terminals using previous approaches in the art are only marginally acceptable in this application, and a need exists for a type of battery terminal which is more successful at withstanding these relatively higher working pressures and extending the overall field life of this type of battery. Of course, if a new type of battery terminal were to be developed which could successfully withstand these higher working pressures and increase the life of this kind of battery, then it should also prove itself to be superior in performance in those battery applications requiring lower working pressures.

The present invention meets this need and overcomes the shortcomings of the prior work in the field. One of the objects of the invention is to produce a battery terminal capable of handling battery pressure differentials across terminal seals ranging from partial vacuum to several atmospheres. Another object of the invention is to produce a battery terminal that would be highly resistant to capillary seepage after repeated thermal cycling. Yet another object of the present invention is to provide a method of manufacturing such battery terminals in a relatively simple manufacturing method that would not require overly sophisticated manufacturing equipment or inordinately high amounts of capital investment.

Metals can be plastically deformed by various processes such as extrusion, drawing, rolling or swaging, A plastically deformed metal becomes stronger and the conventional index of plastic deformation is called cold work. Cold work is the amount of plastic strain introduced during processing of a metal. The increase in hardness resulting from plastic deformation during cold work is called strain hardening. Both the tensile strength and the yield strength of a metal are increased, and accompany this increasing hardness. In the operation known as swaging, metal is force-shaped to the contours of a tool. With regard to the present invention, a swaging operation occurs using an essentially cylindrical, tapered punch, which is forced down through the center of two annular bushings whose internal diameters are less than the external diameter of the punch, resulting in the metal being forced to expand radially and thereby affect work hardening.

SUMMARY OF THE INVENTION

Basically, the improved battery terminal for effecting a seal in a container wall comprises a first outer bushing that is mounted on the inside of an opening in the wall of a container, with a second inner bushing mounted interior of the first bushing. The first bushing, the second bushing and wall opening are then all forced into intimate sealing contact with each other by being swaged together. This is accomplished by means of an appropriately shaped punch and die combination.

DETAILED DESCRIPTION OF THE DRAWINGS

Figure 1:
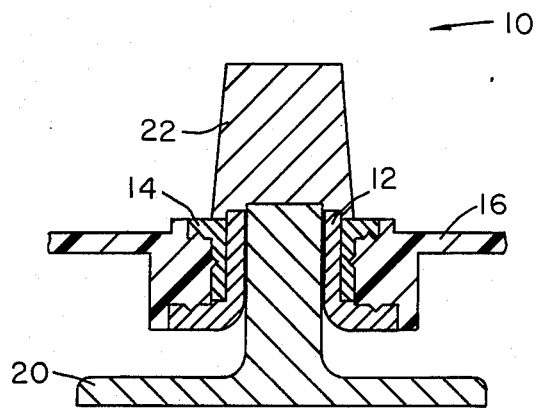
FIG. 1, as shown in cross-section, in one preferred embodiment of the improved battery terminal, showing the inner and outer bushings, the polymeric wall opening in which the bushings are mounted, a battery post and a battery terminal cap.

Turning first to FIG. 1, there is shown generally at 10 one preferred embodiment of the improved battery terminal. At 14 there is a first outer bushing, which is shown in intimate sealing contact with the sealing surface of an opening of a polymeric wall 16. It should be noted here that although the wall 16 has been denoted as being polymeric, it can be any material that is resistant to electrolytes, and which a manufacturer can adapt to this process of fabricating a container for the electrolytic apparatus under consideration. At 12 there is shown a second inner bushing adjacent the interior of the first outer bushing, likewise in intimate sealing contact. Through the annular opening of inner second bushing 12 there has been inserted a battery post means 20, which in this particular illustration is shown to be a post rising from the center of the disc, which disc will be in electrical contact with the contents of the battery. At 22 there is shown a battery terminal cap means which covers a substantial portion of the battery terminal apparatus.

Figure 2:
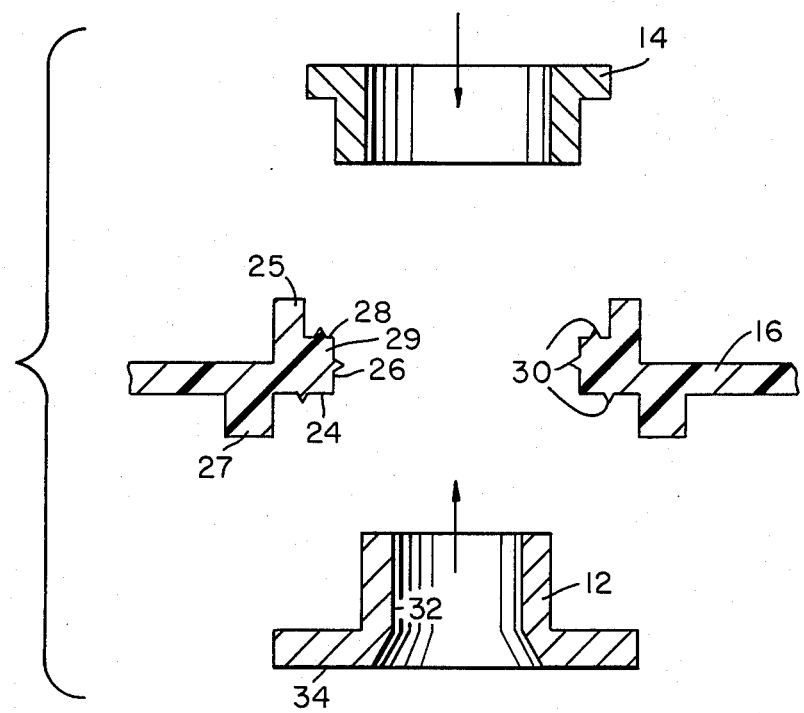
FIG. 2 is a schematic cross-section which indicates the preferred assembly orientation of the inner and outer bushings, and the polymeric wall opening in which they fit.

Turning now to FIG. 2, there is shown in greater detail one preferred method of fitting together the components of the battery terminal responsible for effecting a seal. The first outer bushing 14 is fabricated into a generally T-shaped bushing, having a collar and an outside flange. The first outer bushing is preferably lead, and most preferably an alloy of lead. The outside diameter of the collar of the first outside bushing 14 is only slightly smaller than the inside diameter of the polymeric container wall opening shown at 16. The polymeric container wall opening 16 has radially enlarged portions which form a polymeric bushing, which itself is comprised of an upright lip portion 25, a downward lip portion 27 and an intermediate annular portion 29. The intermediate annular portion 29 has vertical face 26, and two opposed lower and upper horizontal faces, 24 and 28 respectively. Preferably, at least one of the three faces on the intermediate annular portion 29 will have a raised thread or ridge around its periphery, and most preferably there will be one such raised ridge on each of the three faces of the intermediate annular portion, which is illustrated by 30. In this regard, one is directed to the disclosure of U.S. Pat. No. 3,704,173, issued to McClelland et al., which discussed and illustrated structures similar to these raised ridges used in the sealing of an electrolytic device terminal.

After having inserted the first outer bushing 14 into the wall opening 16, the second inner bushing 12 is inserted from the bottom such that the second inner bushing's outside diameter is in contact with the inside diameter of the first outer bushing. The second inner bushing is generally T-shaped in cross-section, having a collar 32 and a flange 34, similar to those of the first outer bushing 14, except that the collar and flange of the second inner bushing 12 will be somewhat differently dimensionally shaped to effectuate a sealing surface around the first outer bushing 14 and polymeric bushing of the wall opening 16, as can be seen by referring back to FIG. 1. The second inner bushing 12 is preferably unalloyed lead, but may be an alloy of lead is special requirements of the battery necessitate it.

Having preassembled the first outer bushing 14 and the second inner bushing 12 into the polymeric bushing formed in the opening of the container wall 16 to form a subassembly, the next step of the swaging operating.

Swaging operations are well known to those skilled in the art, and the process here is quite simple, inasmuch as it merely calls for the insertion of a cylindrically shaped, tapered punch to be inserted into the annular opening of second inner bushing 12. As the taper is progressively moved into the interior of second inner bushing 12, contact is made between the punch and the bushing, progressively forcing the material of first bushing 14 and second bushing 12 radially outward against the contours of the polymeric bushing and the wall opening of the polymeric wall 16. Since lead and most alloys of lead are soft, ductile material, first outer bushing 14 will readily conform to the contours of the polymeric bushing, and likewise second inner bushing 12 will conform to the contours of both the first outer bushing 14 and the remaining contours of the polymeric bushing 16. The final result is the bushing seal subassembly shown generally at 36 in FIG. 3. At FIG. 3, the first outer bushing 14 has been swaged such that it has fully conformed to the upright lip portion 25 and the intermediate annular portion 29, along with the attendant raised ridges on the vertical and upper horizontal faces 26 and 28 of the intermediate annular portion 29. (The sealing contact between first outer bushing 14 and upper horizontal face 28 of the intermediate annular portion 29 is effected by an annular die which constrains the outer portions of the battery assembly during the swaging process.) The second inner bushing has been forced by the swaging operation into intimate sealing contact with the interior diameter of the first outer bushing, and with the lower horizontal face 24 of the intermediate annular portion 29, along with its attendant raised ridge 30. Those skilled in the art will recognize that it is generally desirable to attach at least one lug onto the flange of at least one of the bushings, which lug will seat in at least one correspondingly molded pocket in the polymeric bushing or wall in which the flange of the terminal is seated, so as to resist torsional rotation of the bushing and terminal in the battery wall.

Figure 6:
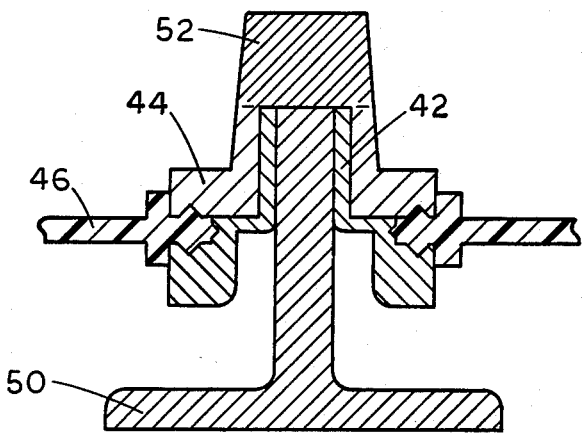
FIG. 6, as shown in cross-section, is a second preferred embodiment of the improved battery terminal showing the inner and outer bushings, the polymeric wall opening in which the bushings are mounted, the battery post and a battery terminal cap.

Turning now to FIG. 6, there is shown generally a second preferred embodiment of the improved battery terminal. At 44 there is a first outer bushing, which is shown in intimate sealing contact with the sealing surface of an opening in the polymeric wall 46. At 42, there is shown a second inner bushing adjacent the interior of the first outer bushing likewise in intimate sealing contact. Through the annular opening of inner second bushing 42 there has been inserted a battery post means 50, which in this particular illustration is likewise shown to be a post rising from the center of a disc, which disc will be in electrical contact with the contents of the battery or cell. At 52 there is shown a battery terminal cap means which covers a substantial portion of the battery terminal apparatus.

Figure 7:
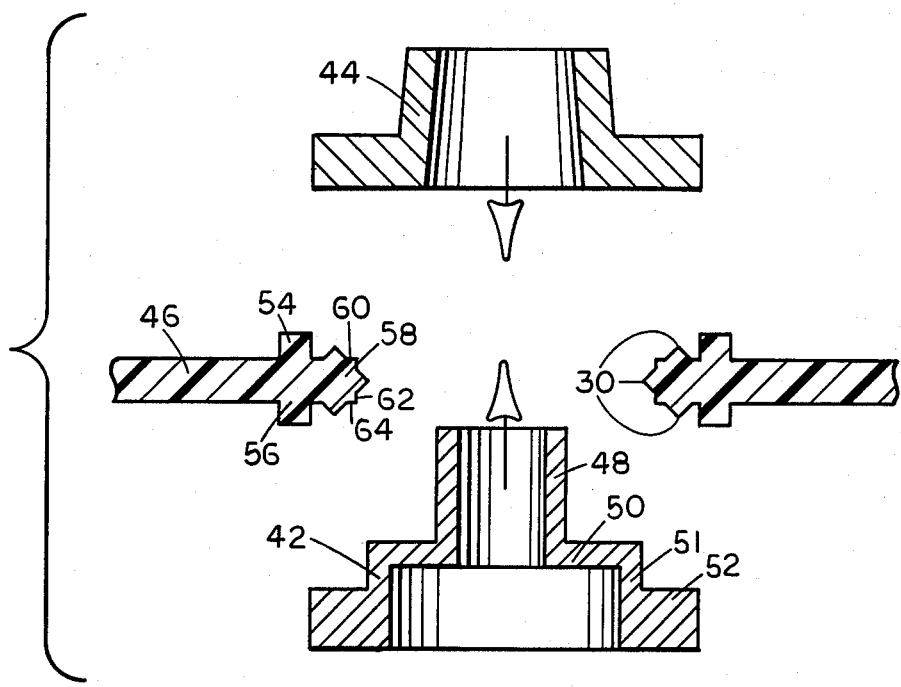
FIG. 7 is a schematic cross-section which indicates the preferred assembly orientation of the inner and outer bushings, and the polymeric wall opening in which they fit.

Turning now to FIG. 7, there is shown in greater detail the preferred method of fitting together the components of the second preferred embodiment of the battery terminal. A first outer bushing 44 is fabricated into a generally T-shaped bushing, having a collar and an outside flange. The outside diameter of the collar of the first outside bushing 44 is only slightly smaller than the inside diameter of the polymeric container wall opening shown at 46. The polymeric container wall 46 has radially enlarged portions which form a polymeric bushing, which itself is comprised of an upright lip portion 54, a downward lip portion 56 and an intermediate annular portion 58. The intermediate annular portion 58 has a vertical face 62, and two opposed lower and upper horizontal faces, 60 and 64 respectively. Preferably, at least one of the three faces on the intermediate annular portion 58 will have a raised thread or ridge around its periphery, and most preferably there will be one such raised ridge on each of the three faces of the intermediate annular portion, which is illustrated by 30. After having inserted the first outer bushing 44 into the wall opening 46, the second inner bushing 42 is inserted from the bottom, such that the second inner bushing's outside diameter is in contact with the inside diameter of the first outer bushing. The second inner bushing is dualflanged. That is, it has a first collar 48, a first outside flange 50, a second collar 51 mounted on a different circumference of the first flange and oriented substantially opposed to the first collar 48, and a second flange 52 mounted on the second collar 51. Again, the second inner bushing 42 is preferably unalloyed lead, but may be an alloy of lead is special requirements of the battery necessitate it.

As before, having preassembled the first outer bushing 44, and the second inner bushing 42 into the polymeric bushing formed in the opening of the container wall 46 to form a subassembly, the next step is the swaging operation. A punch and die brought to bear on the subassembly will progressively force the material of the first bushing 44 and second bushing 42 radially outward against the contours of the polymeric bushing in the wall opening of the polymeric wall 46. Referring back to FIG. 6, it can be seen that the first outer bushing 44 has been swaged such that it is fully conformed to the upper horizontal face 60 of the intermediate annular portion 58, along with the attendant raised ridge thereon. The second inner bushing has been forced by the swaging operation into intimate sealing contact with the interior diameter of the first outer bushing, and with the vertical face 62 and lower horizontal face 64 of the intermediate annular portion 58, along with their attendant raised ridges.

Figure 3:
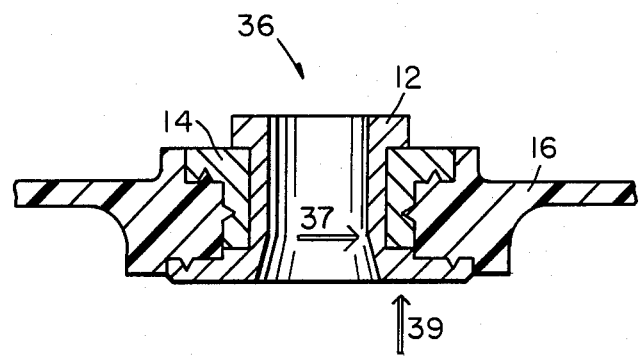
FIGS. 3, 4 and 5 illustrate three slightly different alternative embodiments of the first preferred embodiment of the invention, in which the inner bushing, outer bushing and polymeric wall opening have been swaged together into intimate sealing contact.
Figure 4:
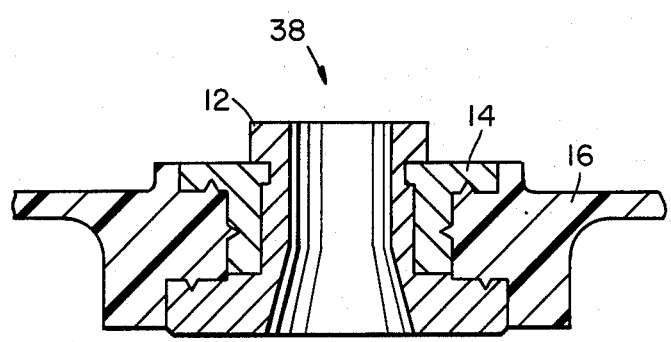
Figure 5:
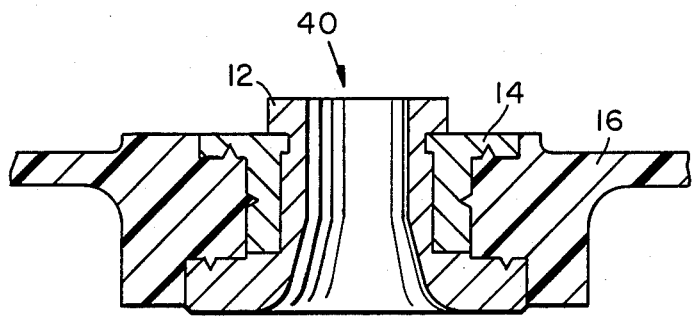

In either of the most preferred embodiments of the invention, fluid (meaning liquid or gas) would have to effect capillary seepage across a plurality of faces and ridges as shown by the cross sections of FIGS. 1, 3 and 6. This sealing interface will be maintained through repeated thermal cycles because alternating expansions and contractions of the polymeric and metallic materials in contact with each other will be overcome by the stresses produced by the work hardening, which has been effected by the swaging operation. More particularly, since in the most preferred embodiments of the invention the first outer bushing is an alloy of lead, and the second inner bushing is unalloyed lead, the first and second bushings will undergo differing degrees of work hardening. When the inner bushing is lead and the outer bushing is lead alloy, we have found that the inner bushing will undergo significant work hardening while the outer bushing will undergo relatively less work hardening, and retain a great deal of its soft, resilient characteristics so that it will readily conform to small changes in movement of the polymer. As alloys, we particularly prefer alloys of antimony or antimony-tin with the alloying metal present in a range of 1-10% by weight, and most preferably present in concentrations of 2-5% by weight.

Furthermore, it should be noted that the swaging operation, which has cold worked the metal, has caused the sealing surfaces of the polymer to be preloaded with stresses in two dimensions, and across three surfaces. Specifically, the sealing surface of the polymer is preloaded by stress in both the axial and lateral directions indicated by arrows 37 and 39 in FIG. 3. (This observation holds true for either preferred embodiment of the invention.) This preloaded stress is distributed across the vertical face and the two opposed upper and lower horizontal faces of the intermediate annular portion 29 of FIG. 2 or 58 of FIG. 7, along with its attendant raised ridges in the most preferred embodiments of the invention. This bi-dimensional, three-surfaced preloaded stress interface forms an exceptionally good barrier to fluid capillary seepage.

Figure 8:
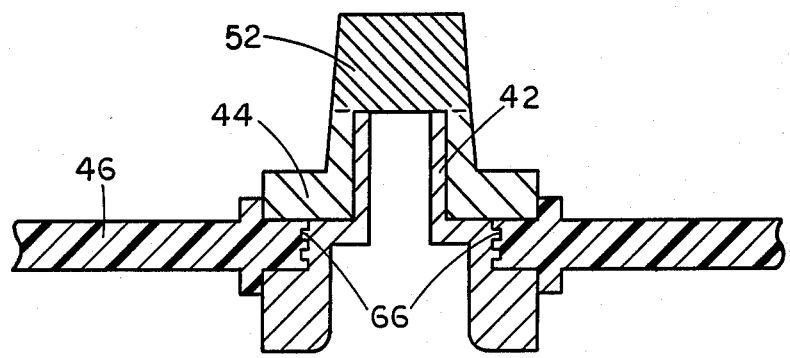
FIGS. 8 and 9 illustrate two slightly different alternative embodiments of the second preferred embodiment of the invention in which the inner bushing, outer bushing and polymeric wall openings have been swaged together into intimate sealing contact with each other.
Figure 9:
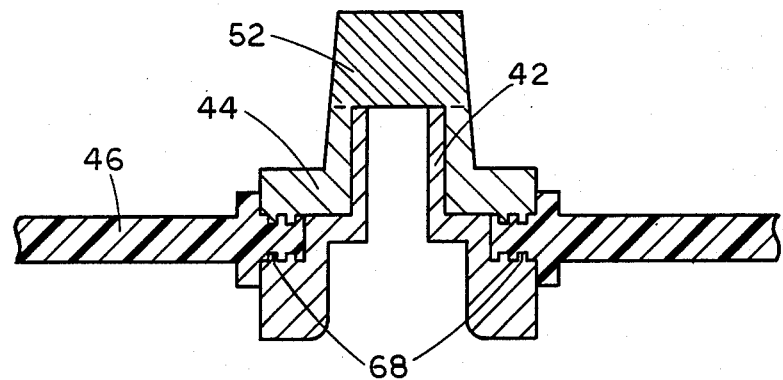

FIGS. 8 and 9 illustrate alternative means at 66 and 68 whereby the sealing distance, across which fluids would have to effect capillary seepage, can be increased. Conceivably, the types of channels or ridges shown at 66 and 68 could be produced in not only the vertical face along, 66 of FIG. 8, or the horizontal faces alone, 68 of FIG. 9, but in the combined horizontal and vertical faces simultaneously as well.

Thereafter, in the assembly of the improved battery terminal, a post means 20 in FIG. 1, or 50 in FIG. 6, is inserted through the interior diameter of the second inner bushing, and a battery terminal cap means 22 in FIG. 1, or 52 in FIG. 6, is attached to the post means and the lead and lead alloy inner and outer bushings. The terminal cap means is most preferably of lead alloy, as it will have to bear the stresses of various clamping means used to connect the terminal of the battery to electrical circuits. The terminal cap means 22 can be cast on or burned on according to methods well known to those skilled in the art. For example, casting the terminal cap means onto the terminal post means at a sufficiently high temperature to cause at least partially molten portions of the cast molten material to penetrate and seal off any remaining interstices between the battery post, second inner bushing, and first outer bushing.

It is thought that the improved battery terminal and method of the present invention and its intended advantages will be understood from the foregoing description, and it will be apparent to those skilled in the art that various changes may be made in the form, construction and arrangements of the parts thereof without departing from the spirit and scope of the invention or sacrificing all of its material advantages. It should be understood that various alternative embodiments are feasible, as illustrated in FIGS. 3, 4, 5, 8 and 9. For example, although not illustrated, an SAE-type terminal design could as easily be used in lieu of the post illustrated. The forms herein described are merely preferred embodiments, and the description herein should not be construed or interpreted as the only embodiment. Although this description has largely discussed application of this invention to the construction of lead terminals for electrolytic devices, this is only one major application of the technology and other applications to the production of other products, such as terminals for effecting fluid type seals in other types of containers are not intended to be precluded. Furthermore, the foregoing specification is also intended to form the necessary disclosure for a method of producing the improved battery terminal, as reflected in the title of this invention. The following claims should therefore be interpreted as broadly as is reasonable.

What is claimed is:

1. An assembly for sealing against leakage of a fluid between a terminal positioned through an opening in a wall of a container and said wall, said assembly comprising:

a first metallic bushing mounted within said opening and having a collar and a flange; and a second metallic bushing mounted within said first bushing and having a collar and a flange, said first bushing and said second bushing being plastically deformed by radial expansion into intimate sealing contact, said terminal capable of insertion through said second bushing.

2. The assembly as claimed in claim 1, in which said wall is a suitable electrolyte resistant, resilient polymeric material.

3. The assembly as claimed in claim 1, in which the first bushing is made of lead.

4. The assembly as claimed in claim 1, in which the first bushing is made of an alloy of lead.

5. The apparatus as claimed in claim 4, in which the alloy comprises lead with an antimony content of 1–10% by weight.

6. The apparatus as claimed in claim 4, in which the alloy comprises lead with an antimony content of from 2–5% by weight.

7. The assembly as claimed in claim 1, in which the first bushing is further comprised of a second collar mounted on a different circumference of the flange and oriented substantially opposed to the collar, and a second flange mounted on the second collar.

8. The assembly as claimed in claim 1, in which the second inner bushing is made of lead.

9. The assembly as claimed in claim 1, in which the second inner bushing is made of an alloy of lead.

10. The assembly of claim 1 wherein said opening defines a substantially annular portion and two opposed faces, said flange of said first metallic bushing contacting one of said faces and said flange of said second metallic bushing contacting the other of said faces.

11. The assembly of claim 1 wherein said first metallic bushing is made of an alloy of lead and said second metallic bushing is made of unalloyed lead thereby causing said first metallic bushing to undergo relatively less work hardening effected by said expansion than said second metallic bushing.

12. An electrolytic device comprising:
 a. a container comprising a wall of resilient, electrolyte-resistant material, said wall having an opening therein;
 b. a first outer substantially annular metallic bushing that is mounted interior of said wall opening;
 c. a second inner substantially annular metallic bushing that is mounted interior of said first bushing, said first bushing and said second bushing being forced into intimate sealing contact with each other and said wall, the first bushing and the second bushing being work hardened by radial expansion to different degrees; and
 d. a terminal post inserted through said second bushing.

13. The apparatus as claimed in claim 12, in which the terminal post has a base that is attached to a disc which is in electrical contact with the contents of the electrolytic device, the post and the disc being made of lead.

14. The apparatus as claimed in claim 12, in which the first outer bushing is made to undergo a greater degree of work hardening by radial expansion than is the second inner bushing.

15. The apparatus as claimed in claim 12, in which the second inner bushing is made to undergo a greater degree of work hardening by radial expansion than the first outer bushing.

16. An electrolytic device comprising:
 a. a container comprising a wall of resilient, electrolyte-resistant material, said wall having an opening therein;
 b. a first outer substantially annular metallic bushing that is mounted interior of said wall opening;
 c. a second inner substantially annular dualflanged metallic bushing that is mounted interior of said first bushing, said first bushing and said second bushing being forced into intimate sealing contact with each other and said wall, the first bushing and second bushing being work-hardened to different degrees; and
 d. a terminal post inserted through said second bushing.

17. The apparatus as claimed in claim 16, in which the terminal post has a base that is attached to a disc which is in electrical contact with the contents of the electrolytic device, the post and the disc being made of lead.

18. The apparatus as claimed in claim 16, in which the first outer bushing is made to undergo a greater degree of work hardening by radial expansion than is the second inner bushing.

19. The apparatus as claimed in claim 16, in which the second inner bushing is made to undergo a greater degree of work hardening by radial expansion than is the first outer bushing.

20. An electrolytic device comprising:
 a. a container comprising a wall of resilient, electrolyte-resistant material, said wall having an opening therein defining a sealing surface and at least one raised ridge on said sealing surface;
 b. a first outside substantially annular metallic bushing that is mounted interior of said wall opening;
 c. a second inside substantially annular metallic bushing that is mounted interior of said first bushing, said first bushing and said second bushing being forced into intimate sealing contact with each other and said wall interior; and
 d. a terminal post inserted through said second bushing, said terminal being in electrical contact with contents of said electrolytic device.

21. An electrolytic device comprising:
 a. a container comprising a wall of resilient, electrolyte-resistant material, said wall having an opening therein defining a sealing surface and at least one raised ridged on said sealing surface;
 b. a first outside substantially annular metallic bushing that is mounted interior of said wall opening;
 c. a second substantially annular dual-flanged metallic bushing that is mounted interior of said first bushing, said first bushing and said second bushing being forced into intimate sealing contact with each other and said wall interior; and
 d. a terminal post inserted through said second bushing.

22. An electrolytic device comprising:
 a. a container comprising a wall of resilient, electrolyte-resistant material, said wall having an opening therein, surrounded by an enlarged portion defining a nonconductive polymeric bushing having at least one raised ridge thereon;
 b. a first outside substantially annular metallic bushing, having a collar mounted interior of said polymeric bushing and an outside flange;
 c. a second inside substantially annular metallic bushing, having a collar mounted interior of said first bushing and an outside flange, said first bushing and said second bushing being radially expanded into intimate sealing contact with each other and said polymeric bushing, providing residual linear and axial stresses on sealing contact surfaces to help maintain said seal; and d. a terminal post inserted through said second bushing.

23. The apparatus as claimed in claim 22, in which said polymeric bushing is further comprised of:
   a. an upright lip portion;
   b. a downward lip portion; and
   c. an intermediate annular portion having a vertical face and two opposed upper and lower horizontal faces.

24. The apparatus as claimed in claim 23, in which at least one raised ridge is present on the vertical, the upper horizontal or the lower horizontal face of the polymeric bushing.

25. The apparatus as claimed in claim 23, in which one raised ridge is present on the vertical, the upper horizontal and the lower horizontal face of the polymeric bushing.

26. An electrolytic device comprising:
   a. a container comprising a wall of resilient, electrolyte-resistant material, said wall having an opening, surrounded by an enlarged portion defining a nonconductive polymeric bushing having at least one raised ridge thereon;
   b. a first outside substantially annular metallic bushing having a collar mounted interior of said polymeric bushing and an outside flange;
   c. a second inside substantially annular dualflanged metallic bushing having a first collar, a first outside flange, a second collar mounted on a different circumference of the first flange and oriented substantially opposed to the first collar, and a second flange mounted on the second collar, said first bushing and said second bushing being radially expanded into intimate sealing contact with each other and said polymeric bushing, providing residual linear and axial stresses on the sealing contact surfaces to help maintain said seal; and
   d. a terminal post inserted through said second bushing.

27. The apparatus as claimed in claim 26, in which said polymeric bushing is further comprised of:
   a. an upright lip portion;
   b. a downward lip portion; and
   c. an intermediate annular portion having a vertical face and two opposed upper and lower horizontal faces.

28. The apparatus as claimed in claim 27, in which at least one raised ridge is present on the vertical, the upper horizontal or the lower horizontal face of the polymeric bushing.

29. The apparatus as claimed in claim 27, in which one raised ridge is present on the vertical, the upper horizontal and the lower horizontal face of the polymeric bushing.

30. The apparatus as claimed in claim 26, in which the outside flange of the first outside metallic bushing has mounted thereon at least one lug, which at least one lug will be seated in at least one correspondingly molded pocket in the polymeric bushing, so as to resist torsional rotation of the bushing.

31. A method of making a battery terminal connection through an opening in the battery case wall comprising the steps of:
   a. fabricating a suitable electrolyte-resistant battery case wall, leaving at least one opening therein;
   b. installing a first, outer annular bushing into the opening of the case wall;
   c. installing a second, inner annular bushing into a bore in the first bushing; and
   d. sealing the first bushing, second bushing and wall opening together by swaging.

* * * * *